United States Patent [19]
Hoshen

[11] Patent Number: 4,598,285
[45] Date of Patent: Jul. 1, 1986

[54] SCHEME FOR REDUCING TRANSMISSION DELAY FOLLOWING COLLISION OF TRANSMISSIONS IN COMMUNICATION NETWORKS

[75] Inventor: Joseph Hoshen, Naperville, Ill.

[73] Assignee: AT&T Bell Laboratories, Murray Hill, N.J.

[21] Appl. No.: 498,792

[22] Filed: May 27, 1983

[51] Int. Cl.$^4$ .......................... H04J 3/02; H04Q 9/00
[52] U.S. Cl. ............................ 340/825.5; 340/825.51; 370/85; 370/94; 370/86
[58] Field of Search .................. 340/825.03, 825.16, 340/825.5, 825.51, 825.52, 825.05; 370/85, 86, 94, 108, 91; 371/32

[56] References Cited

U.S. PATENT DOCUMENTS

| | | | |
|---|---|---|---|
| 4,063,220 | 12/1977 | Metcalfe et al. | 370/93 |
| 4,234,952 | 11/1980 | Gable et al. | 370/85 |
| 4,332,027 | 5/1982 | Malcolm et al. | 370/94 |
| 4,337,465 | 6/1982 | Spracklen et al. | 340/825.03 |
| 4,412,326 | 10/1983 | Limb | 370/85 |
| 4,543,654 | 9/1985 | Jones | 370/86 |

OTHER PUBLICATIONS

*The Ethernet,* "A Local Area Network Data Link Layer and Physical Layer Specification", Sep. 30, 1980, pp. 24-25.

A. K. Agrawala, R. M. Bryant and J. Agre, "Analysis of an Ethernet-Like Protocol," *Proceedings of Computer Networking Symposium,* Dec. 15, 1977, pp. 104-111.

J. P. Shoch et al., "Evolution of the Ethernet Local Computer Network", *Computer,* vol. 15, No. 8, Aug. 1982.

*Primary Examiner*—Donald J. Yusko
*Assistant Examiner*—Sharon L. Hodgkins
*Attorney, Agent, or Firm*—David Volejnicek

[57] ABSTRACT

In a contention type of communication network, the collision backoff time period during which retransmission of collided messages may not be attempted is computed as a multiple of a time slot S such that $B+2A \leq S < 2B+2A$, where A is the maximum interstation propagation delay of the communication medium and B is the intrastation propagation delay of the network stations. The collision backoff time period is timed from the point at which the medium becomes quiescent following collision and transmission of the jam signal.

20 Claims, 5 Drawing Figures

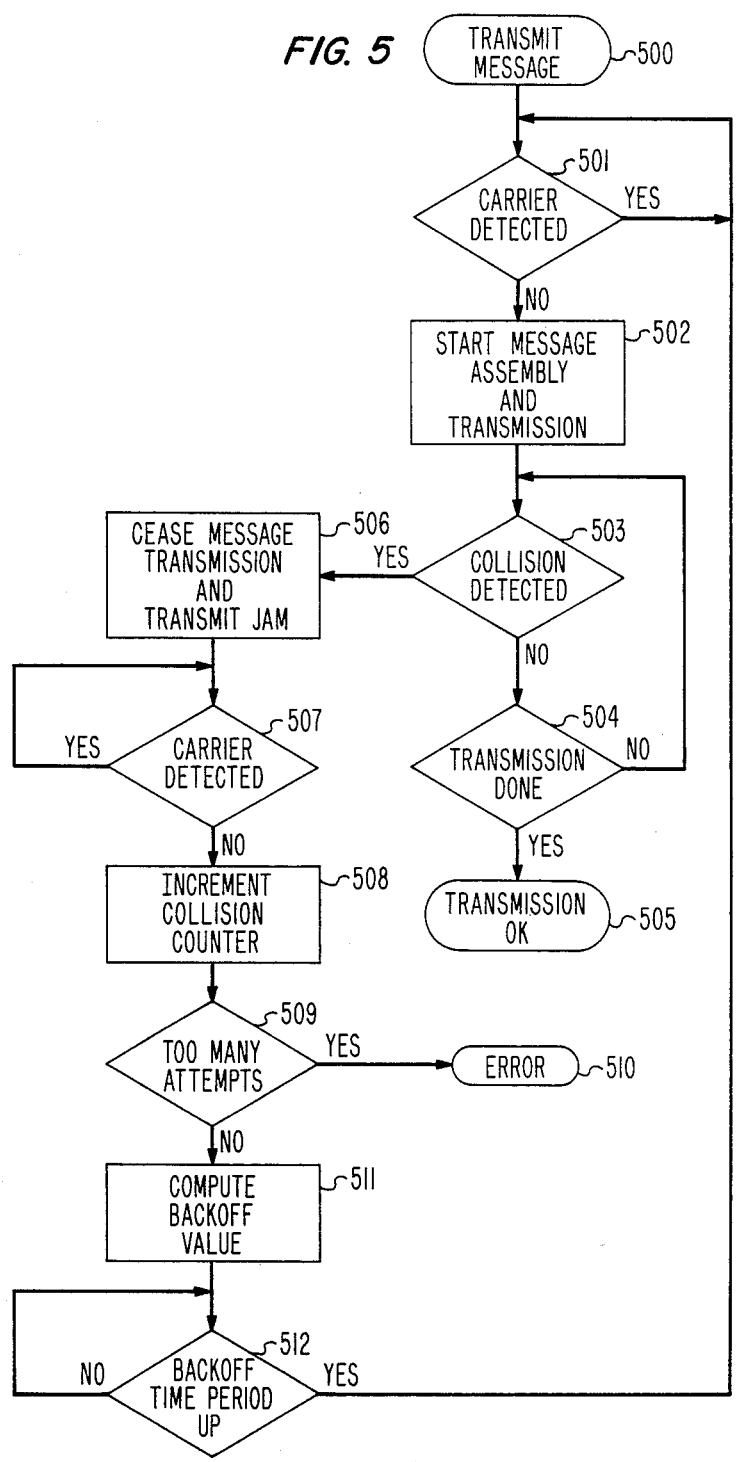

SCHEME FOR REDUCING TRANSMISSION DELAY FOLLOWING COLLISION OF TRANSMISSIONS IN COMMUNICATION NETWORKS

TECHNICAL FIELD

The invention relates to communication networks in general and to the way collisions of transmissions are responded to by contention protocol networks in particular.

BACKGROUND OF THE INVENTION

A communication network includes a communication medium, such as a transmission cable, and a plurality of stations connected to the medium for communication. Each station comprises a communicating device, for example a processor, a mass storage devices, or an input and output terminal, and circuitry for interfacing the device to the medium. Communications on the medium follow a prescribed communication protocol. A protocol is a set of rules describing the circumstances under which a station may communicate on the medium, the format of the communications, the proper response to various eventualities that may occur during communications, and other matters that must be consistent from station to station in order for the various stations to be able to communicate with each other across the medium.

While many communication protocols exist, one type of protocol that has become popular in recent years is the so-called carrier sense multiple access with collision detection (CSMA/CD) protocol. A well-known example of a network based on the CSMA/CD scheme is the Ethernet ® of Xerox Corporation. In a CSMA/CD network such as the Ethernet, the stations contend for use of the communication medium. A station is allowed to transmit on the medium only when it detects the medium to be quiescent, that is, idle. Because of signal propagation delays, it is possible for two or more stations to determine that the medium is quiescent and to start transmitting on the medium substantially simultaneously. These transmissions interfere with each other and become scrambled. This interference is referred to as a collision.

Because the transmissions become scrambled in a collision, retransmission of collided communications is necessary. To minimize the possibility of their transmissions colliding again, the stations must attempt to stagger in time their retransmissions. For this purpose, each station in the network follows a predetermined formula for determining how long it must delay following the occurrence of a collision before reattempting a transmission of a collided communication. The delay time is referred to as a backoff period. Timing of the backoff period is conventionally commenced when a station terminates a collision-producing transmission.

The formula for computing the backoff period uses a random number multiple of a basic delay time period, referred to as a time slot, to determine the backoff period. The time slot is at least equal in duration to the network's to the collision window, which is the maximum time period during which any transmission is in danger of possibly colliding with another transmission. To stagger the stations' retransmissions, the random number is independently generated at each station, and hence the backoff period generally varies from station to station. And to avoid giving any station preferential access to the medium, a new random number is generated at each station following each collision, and hence the backoff period generally varies at each station from collision to collision. Nevertheless, the formula leads to an average period of time following a collision during which period no station will attempt to retransmit a collided communication.

The time during which no station is transmitting and the medium is quiescent is wasted time, overhead, from the viewpoint of network performance. The overhead adversely affects network communication throughput: the greater the overhead, the lower the maximum network capacity per unit of time. Therefore, to maximize network throughput, it is desirable to minimize the average retransmission delay time following a collision. And since the delay time is a product of the time slot, a shortening of the time slot yields a shorter average delay time.

However, the time slot is a function of transmission propagation delays, which are determined by the physical parameters of the network. In particular, the time slot, $S$, has conventionally been computed as $$S \geq 2B + 2A$$

where $A$ is the maximum interstation transmission propagation delay on the medium, and where $B$ is the intrastation propagation delay. $B$ is defined as the time period from the point at which one station initiates a transmission to the point at which another station can avoid initiating a transmission in response to sensing the transmission of the one station, assuming zero interstation transmission propagation delay on the medium. These propagation delays are inherent in the network and hence immutable for that network. Therefore the minimum time slot, as conventionally determined, is presently immutable for a given network, and minimization of the average transmission delay time is constrained thereby.

SUMMARY OF THE INVENTION

The present invention is directed toward alleviating these disadvantages of the prior art. According to the invention, the time slot for determining the backoff period is shortened to yield a shorter average delay time after collision in a communication network comprising a plurality of stations interconnected by a communication medium. Using the previously given definitions of delays $A$ ahd $B$, the backoff period is determined as a function, such as a multiple, of the time slot $S$ wherein $$B + 2A \leq S < 2B + 2A$$

if timing of the backoff period is commenced only when the medium becomes quiescent following interference of a plurality of communications with each other, and communication is allowed to resume following expiration of the backoff period.

Timing of the backoff period from the point at which the medium becomes quiescent enables the use of a shorter than conventional time slot, which in turn advantageously yields a shorter average collision backoff period. The shorter average backoff period lowers overhead of the communication network. The network's communication throughput is thereby improved.

These and other advantages and features of the present invention will become apparent from the following description of the illustrative embodiment of the invention, taken together with the drawing.

BRIEF DESCRIPTION OF THE DRAWING

FIG. 5 is a logical flow diagram of the operation of the transmit logic controller of the transmit control section of FIG. 4.

DETAILED DESCRIPTION

Figure 1:
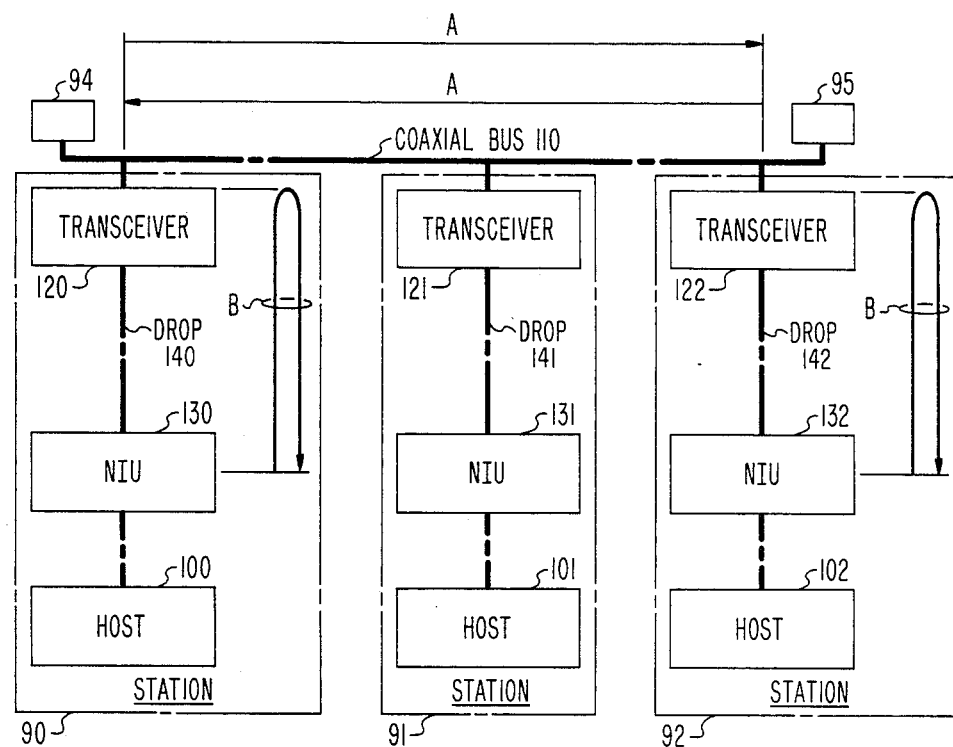
FIG. 1 is a block diagram of an illustrative example of a communication network.

A simplified diagram of a communication network such as the Ethernet is presented in FIG. 1. The network comprises a plurality of communicating stations 90–92 connected for communication to a common communication medium, for example a coaxial cable bus 110. The coaxial cable bus 110 terminates at its ends in conventional terminators 94 and 95 that prevent reflections of communications from the ends of the bus 110. The stations 90–92 include communicating devices, for example processors and peripherals, referred to as hosts 100–102, respectively. The stations 90–92 are connected to the coaxial cable bus 110 via conventional transceivers 120–122, respectively. The hosts 100–102 are interfaced to the transceivers 120–122, respectively, for communication on the bus 110 by network interface units 130–132, respectively. Connection between the network interface units 130–132 and the transceivers 120–122 is via drop cables 140–142, respectively, such as twisted wire pairs.

The hosts 100–102 communicate with each other by having messages transmitted to each other across the bus 110. Because use of the bus 110 is shared by the hosts 100–102, only one host can be effectively transmitting at any one time, and the hosts 100–102 contend for use of the bus 110. Contention resolution is a task of the network interface units 130–132, which operate in response to information about activities on the bus 110 supplied to them by the transceivers 120–122, respectively.

Figure 2:
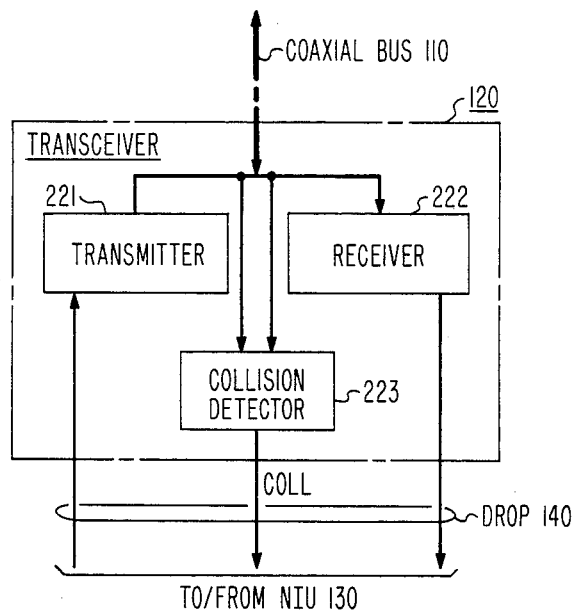
FIG. 2 is a block diagram of a transceiver of the network of FIG. 1.

A representative transceiver 120 is shown in FIG. 2. The transceiver 120 is a conventional unit comprised of a transmitter 221, a receiver 222, and a collision detector 223. The transmitter 221 obtains messages from the network interface unit 130 and broadcasts, transmits, them on the coaxial cable bus 110. The receiver 222 receives all communications, messages, broadcast over the coaxial cable bus 110 and passes them on to the network interface unit 130. The collision detector 223 monitors activities on the bus 110 at the transceiver 120, for example transmissions of the transmitter 221 and receptions of the receiver 222, for purposes of determining the occurrence of collisions of two or more transmissions on the coaxial cable bus 110. When the collision detector 223 detects a collision, it sends a collision-indicative signal (COLL) to the network interface unit 130.

Figure 3:
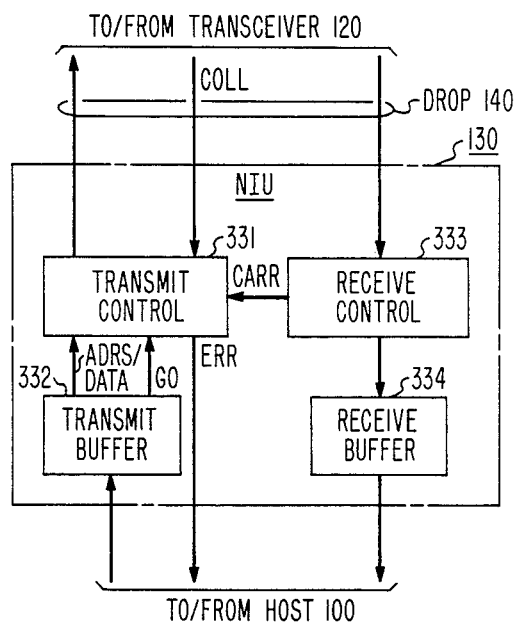
FIG. 3 is a block diagram of a network interface unit of the network of FIG. 1.

A representative network interface unit 130 is shown in FIG. 3. The network interface unit basically comprises a transmit control section 331, a transmit buffer memory 332, a receive control section 333, and a receive buffer memory 334. The receive control section 333 is a conventional circuit that receives messages from the receiver 222, checks the destination addresses of the messages to determine whether they are intended for the host 100, and if so, performs error checking on the messages, extracts data from the messages, transfers the data to the conventional receive buffer memory 334 for temporary storage, and controls the transfer of the data from the receive buffer memory 334 to the host 100, all in a conventional way. The receive control section 333 also conventionally generates a signal, commonly referred to as a carrier detect (CARR) signal, when it detects that the cable 110 is not quiescent i.e., when transmissions passing over the bus 110 and are being received by the receive control section 333 via the receiver 222. The receive control section 333 sends the carrier detect signal to the transmit control section 331.

The transmit control section 331 extracts from the conventional transmit buffer memory 332 destination addresses and data that have been stored therein by the host 100, and forms messages that include the data along with the address information designating the intended recipients of the messages and information suitable for checking the messages for errors, all in a conventional manner. On the basis of the carrier detect signal received from the receive control section 333 and the collision detect signal received from the collision detector 223, the transmit control section 331 determines when a message may be broadcast through the network, and then sends the message to the transmitter 221 for transmission on the coaxial cable 110.

Figure 4:
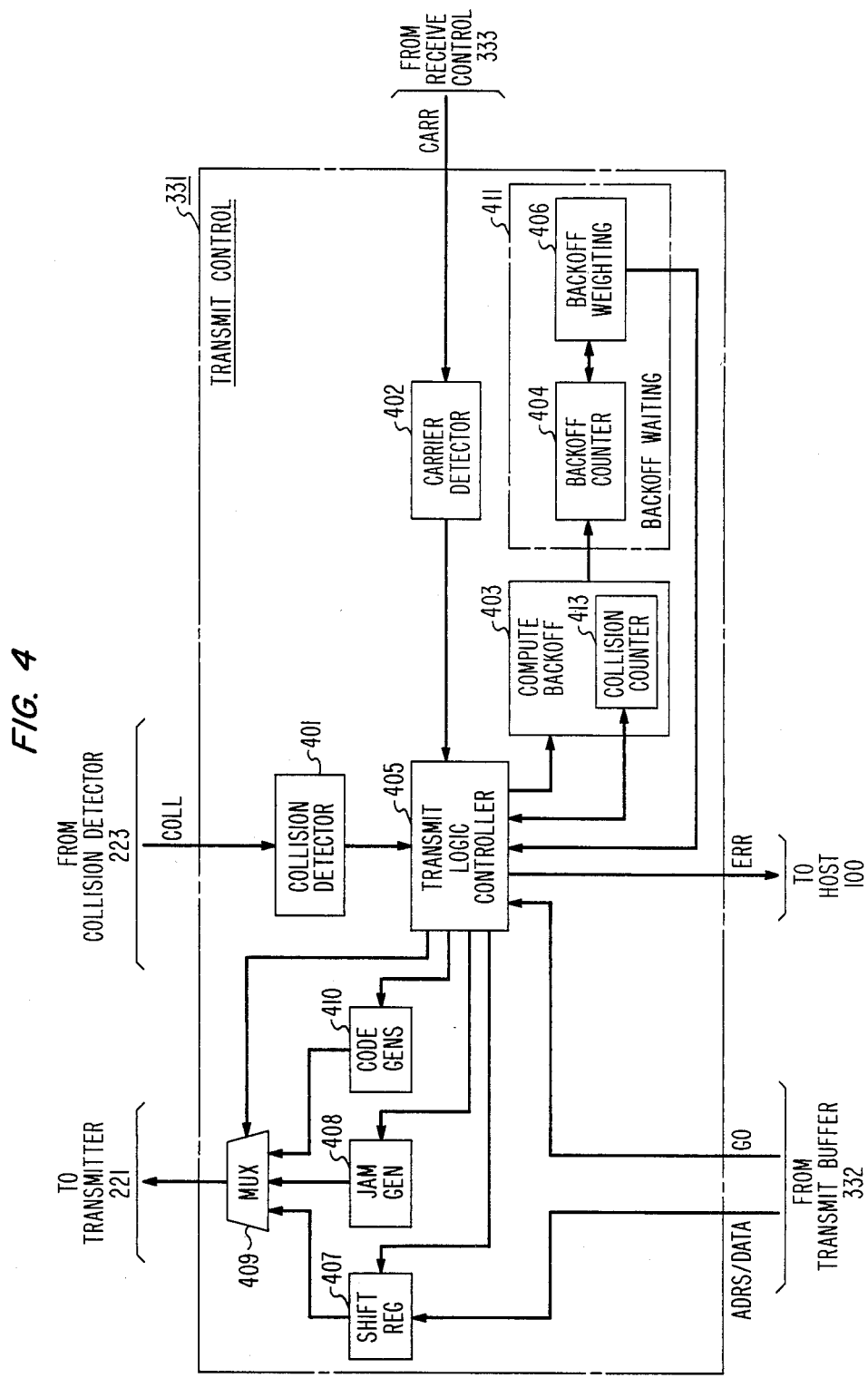
FIG. 4 is a block diagram of the transmit control section of the network interface unit of FIG. 3.

The transmit control section 331 is shown in greater detail in FIG. 4. At the heart of the transmit control section 331 is a transmit logic controller 405. The transmit logic controller 405 controls the transmission of information from the transmit buffer memory 332 to the transmitter 221. The controller 405 provides the intelligence of the transmit control section 331. The transmit logic controller 405 may be, for example, a conventionally implemented sequential state machine, or a conventional microprogrammed controller. The operation of the transmit logic controller 405 is summarized in the logical flow diagram of FIG. 5. FIGS. 4 and 5 should be referred to jointly in conjunction with the following discussion.

When the transmit buffer memory 332 contains information that is to be broadcast through the network, the transmit logic controller 405 receives a signal telling it to transmit a message. This signal may be a signal generated by the transmit buffer memory 332 indicating that the memory 332 is full and sent to the transmit logic controller 405 over a signal line labeled GO in FIG. 4. Alternatively, the GO line may be connected to the host 100 and the signal thereon may be generated by the host 100 after it has loaded the memory 332.

As indicated in block 500 and 501 of FIG. 5, the transmit logic controller 405 responds to the signal commanding it to transmit a message by checking whether the carrier detect signal is present. The transmit logic controller 405 does so by checking the output of a carrier detect circuit 402 which interfaces the carrier detect signal line, originating at the receive control section 333, to the transmit logic controller 405.

If the carrier detect signal is present, indicating that the cable 110 is busy, the transmit logic controller 405 continues to monitor this signal. When the carrier detect signal becomes absent, indicating that the cable 110 is quiescent, the transmit logic controller 405 initiates assembly of a message and transmission thereof to the cable 110, as indicated in block 502 of FIG. 5.

Referring to FIG. 4, the transmit logic controller 405 performs the activities summarized by block 502 by sending appropriately sequenced signals to: conventional code generators 410 to generate a message preamble and an error check code for the message; a shift register 407 to retrieve address and data information from the transmit buffer memory 332 and to convert it into bit serial format; and a multiplexer 409 to selectively couple the outputs of the code generators 410 and the shift register 407 to the drop cable 140 leading to the transmitter 221.

Because transmissions propagate through the network at a finite speed, an interface unit 131-132 may have already begun a transmission when the interface unit 130 found the coaxial cable bus 110 quiescent and began its own transmission. Conversely, an interface unit 131-132 may find the bus 110 to be quiescent and begin transmitting thereon after the interface unit 130 has commenced its transmission. In such situations the simultaneous transmissions collide on the medium 110 and become scrambled. Therefore the collided transmissions must be aborted and then reattempted.

The collision, i.e., the scrambled communications, is sensed by the collision detector 223 which reports it in the form of the collision detect signal to the transmit logic controller 405. Therefore, while the transmit logic controller 405 is undertaking the above-described activities, it also checks for the collision detect signal, as indicated in block 503 of FIG. 5. The transmit logic controller 405 does so by monitoring the output of a collision detect circuit 401 which interfaces the collision detect signal line, originating at the collision detector 223 of the transceiver 120, to the transmit logic controller 405.

If the collision detect signal is not present, indicating that the transmission is proceeding without interference from transmissions originating with other hosts 101-102, and the transmission is not completed, as indicated in block 504, the transmit logic controller 405 continues with the transmission of the message and continues to check for the collision detect signal. If the transmission is completed without detection of a collision, as suggested by the block 504, the transmission is deemed a success, as indicated in block 505, and the transmit logic controller 405 then resumes waiting for the receipt of the next transmit message signal over the GO line.

Returning to a consideration of the block 503, if at any time during the transmission of the message from the transmit control 331 a collision is detected, the transmit logic controller 405 responds thereto by causing message transmission to cease and a jam signal to be transmitted, as indicated in block 506. The transmit logic controller 405 does so by: sending signals to the shift register 407 and the code generators 410 to turn them off; sending a signal to a jam generator 408 to cause it to generate a predetermined signal sequence; and sending a signal to the multiplexer 409 to cause it to couple the output of the jam generator 408 to the drop line 140 leading to the transmitter 221. The signal sequence generated by the jam generator 408 is transmitted on the bus 110 and reinforces there the collision, guaranteeing that the duration of the collision is sufficient to ensure its detection by all transmitting stations in the network.

Following transmission of the jam signal, the transmit logic controller 405 monitors the output of the carrier detect circuit 402, as indicated in block 507. While the carrier detect signal is present, the transmit logic control 405 continues to wait and to monitor further the presence of the signal. Only when the carrier detect signal ceases to be present, indicating that the cable 110 has become quiescent, does the transmit logic controller 105 begin to time a collision backoff period before reattempting transmission.

As indicated by block 508, upon sensing that the coaxial cable 110 has become quiescent, the transmit logic controller 405 increments a collision counter 413 of a backoff compute circuit 403, to keep track of the number of times a failed attempt has been made to transmit the message. As indicated in block 509, the transmit logic controller 405 then checks the count of the collision counter 413 to determine whether the count has exceeded a predetermined threshold. If so, the transmit logic controller 405 generates an error signal, as indicated in block 510, and sends the error signal to the host 100 over the signal line designated as ERR in FIG. 4. If the threshold count has not been exceeded, the transmit logic controller 405 sends a signal to the backoff compute circuit 403 to cause it to compute a backoff value, as suggested by block 511.

The backoff compute circuit 403 is a conventional circuit of the type used in contention protocol networks to compute a backoff value for use in collision avoidance. Conventionally, the backoff value, designated as R, is a random number that is optionally modified, for example multiplied, by the number of collisions experienced by the transmitted message, which is the count of the collision counter 413. The value of R depends on the specific backoff algorithm employed, and various backoff algorithms are known to the art. But for purposes of collision avoidance, R is generally selected from any group of numbers the difference between any two of which is at least one. Conventionally, R is generally selected from non-negative pseudo-random integers. The backoff value R is utilized in determining the backoff period for which the transmit logic controller 405 must wait following a collision before attempting to retransmit the collided message. The compute backoff circuit 403 computes the backoff value and loads it into backoff waiting circuit 141. The circuit 141 uses the backoff value to compute the backoff time period, and then times the backoff time period for the transmit logic controller 405.

After it has caused the backoff value to be computed at the block 511, the transmit logic controller 405 begins to monitor the output of the backoff waiting circuit 411 to determine whether the backoff time period has expired, as indicated in block 512.

The backoff waiting circuit 411 includes a backoff counter register 404 and a backoff weighting circuit 406. The backoff counter register 404 stores the backoff value R that is received from the compute backoff circuit 403. The backoff weighting circuit 406 is a timing circuit that periodically decrements the value of the backoff counter 404. The time interval between decrementations is the time slot S of the network. Since it takes R time slot periods to decrement the count of the backoff counter 404 to zero, the backoff time period, designated as T, can be expressed as the product $$T = R \cdot S$$

The time slot S is a function of the network delay parameters B and A, as was mentioned previously. The delay parameter A is the interstation, or medium, propagation delay, i.e., the time it takes a signal transmitted on the coaxial cable bus 110 by a station 90 at one end of the cable 110 to traverse the bus 110 to a station 92 at the opposite end of the bus 110. Because stations may be connected to the utmost ends of the bus 110, A is generally taken to be the end-to-end propagation delay of the bus 110, which is a function of the length of the bus 110, as suggested by the pictorial representation of A in FIG. 1.

The delay parameter B is the intrastation propagation delay. B is measured as the time from the point at which the transmit logic controller 405 of one station, for example the station 90, generates signals at its outputs to initiate a transmission, such as signals to the code generators 410 and the multiplexer 409 to generate and transfer out to the bus 110 the preamble of a message, to the point at which the transmit logic controller 405 of another station, for example the station 92, can avoid generating signals at its outputs that would initiate a transmission, in response to detecting the transmission of the one station 90, such as in response to receiving a carrier detect indication from the carrier detect circuit 402. The computation of the delay parameter B assumes no inter-station propagation delay, i.e., it excludes A. The parameter B includes the signal propagation delay from the transmit logic controller 405 of a station to the bus 110. The parameter B also includes the signal propagation delay from the bus 110 to the transmit logic controller 405 of a station and the time of response to the signal by the controller 405. Since the stations 90–92 are assumed to be substantially identical, except for the hosts 100–102, the parameter B may also be defined to include the signal propagation delay loop from the transmit logic controller 405 of a station, for example the station 90, to the bus 110 and back from the bus 110 to the transmit logic controller 405 of the same station 90, and the time of response to the signal by the controller 405, as suggested by the pictorial representation of B in FIG. 1. Thus the parameter B may be seen to represent the propagation delay within a single station, even though the measurement of B is defined in terms of two stations.

In the network as described herein, the lower bound for the time slot S is taken to be $$S = B + 2A$$

Hence when the value of the network time slot S is taken to be $$B + 2A \leq S < 2B + 2A$$

and the backoff time period is timed from the point of the bus 110 becoming quiescent following a collision, as described above, the average time period of transmission delay following a collision may be reduced in comparison to its conventional value without increasing the probability of occurrence of a further collision, providing that all other things remain equal. Since the average period of quiescence is reduced, network throughput capacity is improved.

The value of S is selected such that $$B + 2A \leq S < 2B + 2A,$$

and preferably such that $$S = B + 2A,$$

and the backoff weighting circuit 406 is preadjusted to repeatedly time the selected time slot S. Upon timing out the time slot S, the backoff weighting circuit 406 decrements the contents of the backoff counter 404 by one. Thus the backoff weighting circuit 406 must time out the time slots a total of R times, for a total elapsed time period of T, before the backoff counter 404 is decremented to zero. When the backoff counter 404 is decremented to zero, the backoff weighting circuit 406 signals to the transmit logic controller 405 that the backoff period has elapsed. Following the expiration of the backoff time period, the transmit logic controller 405 is allowed to return its operation to the block 501 to reattempt transmission of the collided message.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. Method of handling interfering communications in a communication network comprising a communication medium and a plurality of stations connected to the medium for communication, each station having intrastation propagation delay of B and the medium having maximum interstation propagation delay of A, comprising the steps of:

detecting interfering communications;
   monitoring the medium to detect when the medium becomes quiescent following detection of the interfering communications;
   determining a backoff time period as a function of a time slot S wherein $$B + 2A \leq S < 2B + 2A;$$

waiting for expiration of the backoff time period following the medium becoming quiescent; and
   communicating following the expiration of the backoff time period.

2. The method of claim 1 wherein the step of determining a backoff time period comprises the step of:
   determining the backoff time period as a multiple of a time slot S wherein $$B + 2A \leq S < 2B + 2A.$$

3. The method of claim 1 wherein the step of determining a backoff time period comprises the step of:
   determining the backoff time period as a multiple R of a time slot S wherein $$B + 2A \leq S < 2B + 2A$$

and wherein R is a number selected from a group of numbers the difference between any two of which is at least one.

4. The method of claim 1 wherein the step of determining a backoff time period comprises the step of:
   determining the backoff time period as a multiple R of a time slot S wherein substantially $$S = B + 2A,$$

and wherein R is a number selected from a group of numbers the difference between any two of which is at least one.

5. The method of claim 1 wherein the step of monitoring the medium is preceded by the step of:
communicating on the medium indication of interference.

6. The method of claim 1 wherein the steps are performed by each station whose communications are involved in the interference.

7. Method of handling at a station a collision of signal transmissions of a plurality of stations in a communication network having a communication medium and a plurality of stations connected to the medium for communication, the stations contending with each other for signal transmission access to the medium, the medium having maximum interstation propagation delay of A and each station having intrastation propagation delay of B, comprising the steps of:
detecting a collision;
transmitting on the medium a collision enforcing signal in response to the detection of the collision;
monitoring the medium to detect when the medium becomes quiescent following transmission of the collision enforcing signal;
determining a backoff time period as a multiple R of a time slot S wherein $$B+2A \leq S < 2B+2A,$$

and wherein R is a number selected from a group of numbers the difference between any two of which is at least one;
waiting for expiration of the backoff time period upon the detection of the medium being quiescent; and
retransmitting signals involved in the collision following expiration of the backoff time period.

8. The method of claim 7 wherein the step of determining a backoff time period comprises the step of:
determining the backoff time period as a multiple R of a time slot S wherein substantially $$S = B + 2A$$

and wherein R is a number selected from a group of numbers the difference between any two of which is at least one.

9. The method of claim 7 wherein the steps are performed by each station, whose signal transmissions are involved in the collision.

10. Apparatus for handling interfering communications in a communication network comprising a communication medium and a plurality of stations connected to the medium for communication, each station having intrastation propagation delay of B and the medium having maximum interstation propagation delay of A, comprising:
means for detecting interference of communications;
means for determining a backoff time period as a function of a time slot S wherein $$B+2A \leq S < 2B+2A;$$

means responsive to the detecting means for monitoring the medium to detect when the medium becomes quiescent following detection of the interference of communications;

means responsive to the determining means and to the monitoring means for timing the backoff time period following the medium becoming quiescent and for indicating expiration of the backoff time period; and
means responsive to the timing and indicating means for communicating following the indication of expiration of the backoff time period.

11. The apparatus of claim 10 wherein the determining means comprise:
means for determining the backoff time period as a multiple of a time slot S wherein $$B+2A \leq S < 2B+2A.$$

12. The apparatus of claim 10 wherein the determining means comprise:
means for determining the backoff time period as a multiple R of a time slot S wherein $$B+2A \leq S < 2B+2A,$$

and wherein R is a number selected from a group of numbers the difference between any two of which is at least one.

13. The apparatus of claim 10 wherein the determining means comprises:
means for determining the backoff time period as a multiple R of a time slot S wherein substantially $$S = B + 2A,$$

and wherein R is a number selected from a group of numbers the difference between any two of which is at least one.

14. The apparatus of claim 10 further comprising:
means responsive to the interference detecting means for communicating on the medium indication of interference when interference is detected.

15. Apparatus for handling interfering communications in a station of a communication network comprising a communication medium and a plurality of stations connected to the medium for communication, each station having intrastation propagation delay of B and the medium having maximum interstation propagation delay of A, the apparatus comprising:
means for detecting interference with a communication of the station;
means for determining a backoff time period as a function of a time slot S wherein $$B+2A \leq S < 2B+2A;$$

means responsive to the detecting means for monitoring the medium to detect when the medium becomes quiescent following detection of the interference with the communication;
means responsive to the determining means and to the monitoring means for timing the backoff time period following the medium becoming quiescent and for indication expiration of the backoff time period; and
means responsive to the timing and indicating means for repeating the communication following the indication of expiration of the backoff time period.

16. Apparatus for handling a collision of signal transmissions of a plurality of stations, for use in a station of a communication network having a communication medium and a plurality of stations connected to the medium for communication, the stations contending with each other for access to the medium, the medium having maximum interstation propagation delay of A and each station having intrastation propagation delay of B, the apparatus comprising:

means for detecting a collision;

means responsive to the collision detecting means for transmitting on the medium a collision-enforcing signal in response to the detection of the collision;

means for determining a backoff time period as a multiple R of a time slot S wherein $$B+2A \leqq S < 2B+2A,$$

and wherein R is a number selected from a group of numbers the difference between any two of which is at least one;

means responsive to the transmitting means for monitoring the medium to detect when the medium becomes quiescent following transmission of the collision enforcing signals;

means responsive to the monitoring means and to the determining means for timing the backoff time period following the medium becoming quiescent and for indicating expiration of the backoff time period; and means responsive to the timing and indicating means for retransmitting signals involved in the collision following expiration of the backoff time period.

17. The apparatus of claim 16 wherein the determining means comprise:

means for determining the backoff time period as a multiple R of a time slot S wherein substantially $$S = B + 2A,$$

and wherein R is a number selected from a group of numbers the difference between any two of which is at least one.

18. Apparatus for interfacing a device for communications to a communication medium for use in a station of a communication network comprising the communication medium and a plurality of stations connected to the medium for communication, the medium having maximum interstation propagation delay of A and each station having intrastation propagation delay of B, comprising:

means for transmitting signals to the medium;

means cooperative with the transmitting means for indicating collision of the transmitted signals with signals of another station;

means for determining a backoff time period as a multiple R of a time slot S wherein $$B+2A \leqq S < 2B+2A,$$

and wherein R is a number selected from a group of numbers the difference between any two of which is at least one;

means for indicating that the medium is quiescent; and means responsive to the quiescence indicating means, the collision indicating means, and the determining means, for preventing the signal transmitting means from retransmitting the collided transmitted signals for the duration of the backoff time period from indication of the medium becoming quiescent following indication of collision.

19. The apparatus of claim 18 further comprising:

means responsive to the collision indicating means for causing the signal transmission means to transmit a jam signal in response to indication of collision.

20. The apparatus of claim 18 wherein the determining means comprise means for determining the backoff time period as a multiple R of a time slot S wherein substantially $$S = B + 2A,$$

and wherein R is a number selected from a group of numbers the difference between any two of which is at least one.

* * * * *